Feb. 11, 1941. J. KOLBE 2,231,338
STEERING GEAR FOR CURVE COMPENSATING VEHICLES
Filed April 28, 1937 3 Sheets-Sheet 2
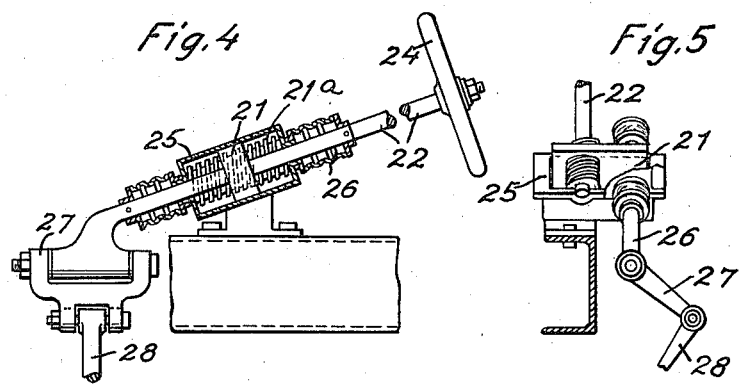
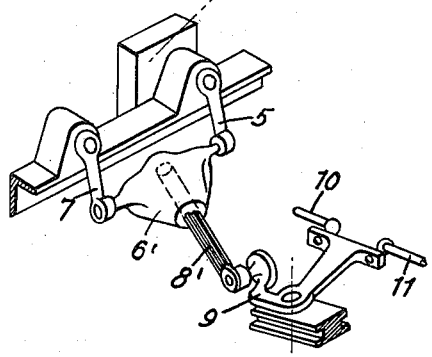
Inventor:
Joachim Kolbe
BY
ATTORNEYS Feb. 11, 1941.    J. KOLBE    2,231,338
STEERING GEAR FOR CURVE COMPENSATING VEHICLES
Filed April 28, 1937    3 Sheets-Sheet 3
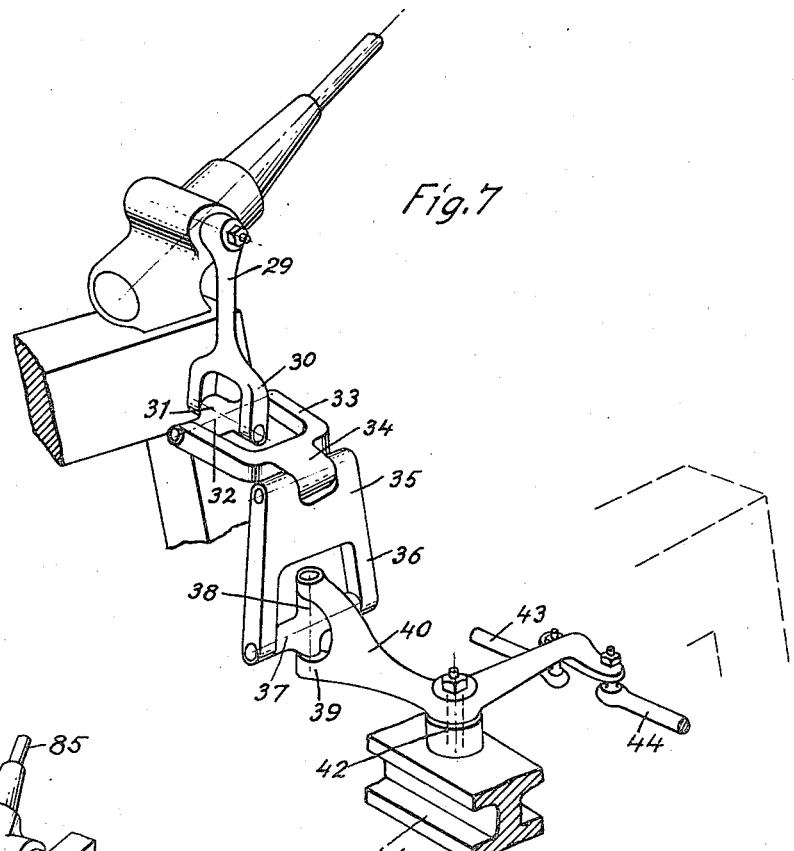
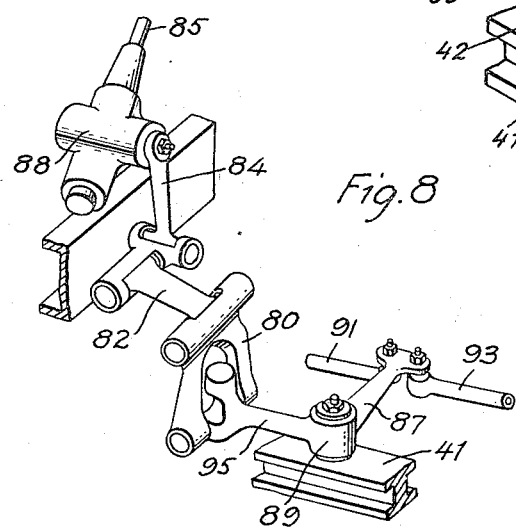
Inventor:
Joachim Kolbe
BY
ATTORNEYS Patented Feb. 11, 1941

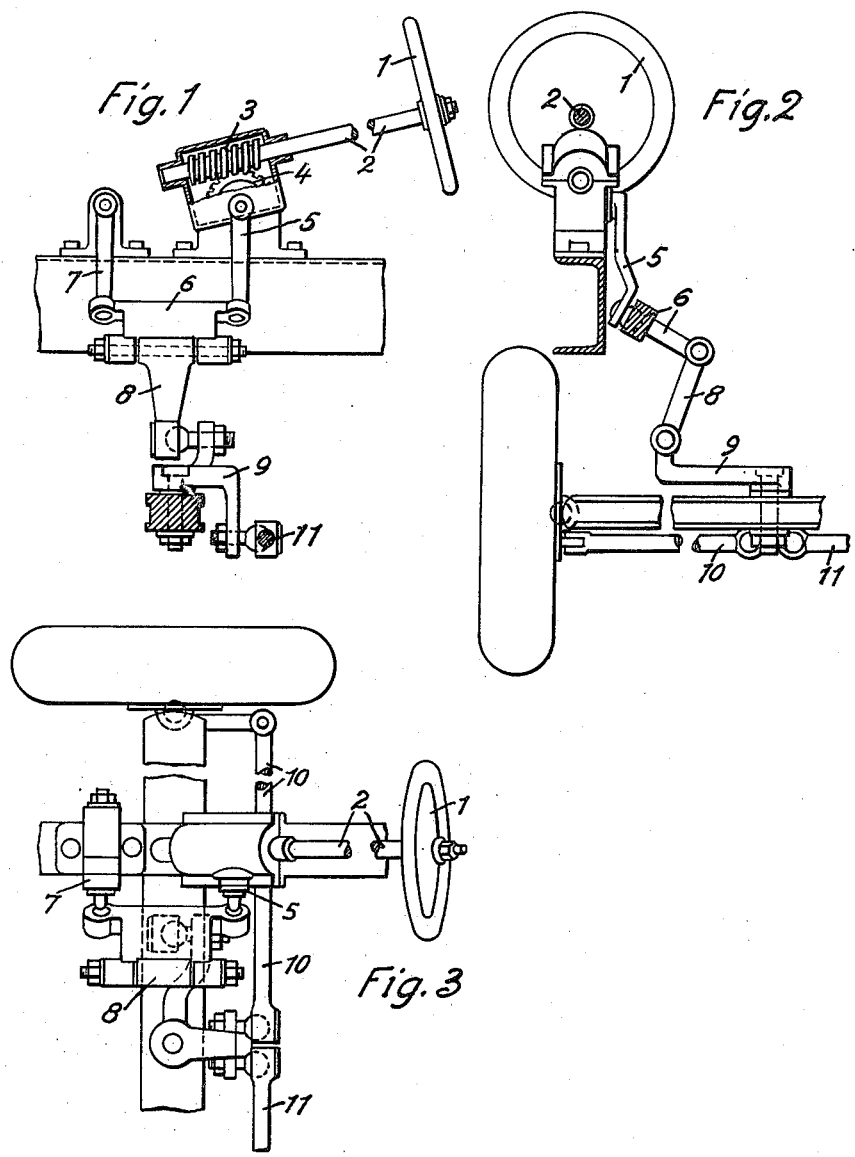

2,231,338

UNITED STATES PATENT OFFICE 2,231,338

STEERING GEAR FOR CURVE COMPENSATING VEHICLES

Joachim Kolbe, Hanover, Germany

Application April 28, 1937, Serial No. 139,601
In Germany May 4, 1936

11 Claims. (Cl. 230—95)

This invention relates to vehicles, and more particularly to steering mechanisms for so-called curve compensating vehicles.

With such vehicles, as illustrated in Kolbe Patents No. 2,072,521, issued March 2, 1937, and No. 2,094,541, issued September 28, 1937, the superstructure or body, under the action of certain forces, in particular those arising from centrifugal action, places itself when the vehicle is running on a curve, in an inclined position with respect to the axles or wheel supporting means of the vehicle, transversely to the direction of travel of the vehicle. This inclination of the superstructure or body with respect to the axles of the vehicle necessitates the employment of a particular construction as regards the steering members between the steering wheel and the front wheels of the vehicle. It has hitherto been proposed to provide long thrust rods between the worm lever and the steering lever for equalization purposes, or respectively, to shift the rotary movement of the steering shaft, with the interposing of universal joints, always into the theoretical axis of rotation of the body. With such arrangements, a whole series of constructional members are necessary, as furthermore, the shaft of the steering wheel is, inter alia, parallel to the running plane, which necessitates undesired modification of the position hitherto usual of the steering shaft.

According to the present invention, a steering gear for curve compensating vehicles is provided, wherein the steering movement is transformed at a joint in the steering rod system into a movement parallel to the longitudinal axis of the vehicle and there is provided at this joint a folding or telescopic link, the thrust transmitting path of which is parallel to the said longitudinal axis of the vehicle and the plane of folding or combined angular and telescopic movement of which is transverse thereto.

On the inclination of the superstructure with respect to the axles of the vehicle, the angle of the folding link varies, or the telescopic link lengthens or shortens. This variation of the angle of the folding link, however, or as the case may be, the lengthening or shortening of the telescopic link, has no influence on the actual steering movement, since this takes place, at the joint in the system whereat the folding or telescopic link is situated, in a direction which is parallel to the longitudinal axis of the vehicle.

The invention will now be further described with reference to the accompanying drawings which illustrate by way of example several embodiments of the invention, and in which:

Figures 1, 2 and 3 are respectively side, front and plan views of one illustrative embodiment of the invention;

Figures 4 and 5 are respectively side and front views of another illustrative embodiment of the invention;

Figure 6 is a perspective view showing a third embodiment, and

Figure 7 is a perspective view showing another embodiment, and

Figure 8 is a further perspective view showing still another embodiment.

Referring now to the embodiment shown in Figures 1 to 3, the steering gear comprises a hand wheel 1, a steering shaft 2, a steering worm 3, a worm segment 4 and a worm actuated lever 5. By means of the hand wheel 1, the worm lever 5 is so actuated through the steering shaft 2, the said worm 3 and segment 4 engaging one another, that it can rotate out of its zero position forward or backward through an angle of about 30° at either side of the zero position.

A thrust plate 6 which is articulated at one corner on one side to the free end of the worm lever 5 and at the opposite corner on the same side to the free end of a supplementary lever 7, the articulation to each of these levers being through the intermediary of a ball joint, is movable in a path which is always parallel to the direction of travel of the vehicle or longitudinally thereof, the supplementary lever 7 with the worm casing and the accessory parts being mounted on the superstructure frame and the said lever 7 being capable only of a movement similar to that of the worm lever 5. The two other corners of the thrust plate 6, on the opposite side thereof to that at which the plate is articulated to the levers 5, 7, form bearings for a hinge pin fitted through one end of a link member 8. At the other end of the link member 8, the latter is articulated to the free end of one arm of a bell crank lever 9. This lever is mounted upon the front wheel axle of the vehicle, with its axis vertical and with the said arm to which the link member 8 is articulated, disposed transversely of the vehicle while the other arm is disposed longitudinally thereof. With this arrangement, the thrust plate 6 and the link member 8, which together form a folding link, the thrust transmitting path of which is parallel to the longitudinal axis of vehicle and the plane of folding of which is transverse thereto, are caused to move along a path parallel to the direction of travel of the vehicle when the hand wheel 1 is turned to impart steering movement to the parts of the gear, and the movement of the folding link along this path occasions movement of the free end of the first-mentioned arm of the bell crank lever 9 also along a path, the direction of which is approximately parallel to the direction of travel of the vehicle, while the free end of the other arm of the said lever 9 is caused to move along a path, the direction of which is transverse to the said direction of travel.

The articulation of the link member 8 to the said first-mentioned arm of the lever 9 is through the intermediary of a ball joint, and the free end of the other arm of the lever 9 is articulated to a pair of oppositely extending thrust rods 10, 11 disposed transversely of the direction of travel of the vehicle, also through the intermediary of ball joints. These thrust rods 10, 11 are operatively connected with the front wheels of the vehicle in the well known manner (see Figs. 2 and 3).

With reference to the embodiment of the invention illustrated in Figures 4 and 5, the arrangement employed in this embodiment is one in which a worm nut 21 fitting over the steering worm 21a is moved upwardly and downwardly in the direction of length of the steering column 22 upon rotation of the hand wheel 24 of the gear. This movement of the worm nut 21 is imparted to a thrust tube 26 fixed to the worm nut 21 in the worm housing 25, the thrust tube 26 being rigidly connected to the worm nut 21. The thrust tube 26 is formed at its lower end as a bearing for one end of a thrust plate 27, but in such a manner that this plate, as a part of a folding link formed by the plate and a link member 28, can only move, like the folding link itself, exactly transversely to the direction of travel of the vehicle and along a path parallel to the road surface, since if the folding link were to work parallel to the line of the steering shaft, a movement of the superstructure in relation to the wheel supporting means or axle would produce a faulty steering of the wheels. The link 28 is connected to the rods through a bell crank in a manner similar to the showing of the invention in Figures 2 and 4. Generally speaking, all hinged bearings with the exception of the hinged connection of the two parts of the folding link, can also be made as ball joint bearings, with the advantage of possibility of adjustment.

Instead of the arrangement of a folding link with an intermediate joint, it is possible to use a thrust rod with a crown sleeve. Such a system is shown in Figure 6.

According to the arrangement shown in this figure, the telescopic link constituted by the thrust rod and crown sleeve comprises a part 8' which as the link lengthens or shortens with the transverse and accompanying rising or falling movements of the superstructure, will move further out of or further into a sleeve-shaped part 6' constituting the equivalent part in this arrangement of the thrust plate 6 of the arrangement shown in Figures 1 to 3, the part 8' being splined to the part 6' and these two parts forming together a telescopic link, the thrust transmitting path of which is parallel to the longitudinal axis of the vehicle and the plane of angular and telescopic movement of which is transverse thereto. In this way, on account of the hinged connection of the part 6' to the levers 5, 7, which correspond to the levers 5, 7 of the arrangement shown in Figures 1 to 3, and of the part 8' to the transverse arm of the bell-crank lever 9, which together with the parts 10, 11 correspond respectively to the parts of these denominations of the said arrangement of Figures 1 to 3, a free oscillation of the superstructure becomes possible without the oscillation influencing in any way the steering gear.

With the embodiments above described, the thrust plate 6 is hinged on the one hand to the worm actuated lever 5 and on the other hand to the supplementary lever 7. The supplementary lever with its bearing block and the ball joint connection necessary therewith between the thrust plate and the lever, can be avoided if the two members of the folding link are connected the one with the worm lever 5 and the other with the bell crank lever 9 by universal joint means.

The axes of the universal joints may be carried respectively by the two members of the link which are parallel in all positions of the parts to the longitudinal axis of the vehicle.

Figure 7 shows such an arrangement. As shown in this figure, the worm lever 29 forms at its free end one of the forks 30 of a universal joint, the intersecting axes of which are marked respectively 31, 32. The arrangement is such that the axis 31 of the joint is parallel to the axis about which the worm lever 29 oscillates and thus also parallel to the road or longitudinally of the vehicle. The two axes 31, 32 are perpendicular to one another as is characteristic of a universal joint, and the second axis 32 is carried in a forked part 33 of a thrust plate 34, the said forked part constituting the other fork of the universal joint. The thrust plate 34 forms one of the link members of a folding link similar in principle to the folding link 6, 8 or 27, 28 of the constructions described above. The other link member of the folding link is formed by a second plate 35, the lower end of which is forked and forms one of the forks 36 of a second universal joint, the intersecting axes of which are marked respectively 37, 38. The axis 37, which is parallel to the longitudinal axis of the vehicle, is carried in the fork 36 of the joint and the other axis 38, which is perpendicular to the axis 37 and also to the road is carried in a fork 39 at the free end of the transversely extending arm of a bell crank lever 40. The bell crank lever 40 is mounted upon the axle or wheel supporting means 41 of the vehicle through the intermediary of a vertically disposed pivot pin 42 and the other, longitudinally extending, limb of the lever is articulated to the adjacent ends of a pair of oppositely extending tie rods 43, 44 leading respectively to the steering arms of the two wheels at either side respectively of the vehicle.

With this arrangement, as in the previously described constructions, an angle joint is provided between the worm lever 29 and the bell crank lever 40, the three pivoted axes of which, located respectively at the apex of the two limbs of the joint and at the two free ends of said limbs, are parallel in all positions of the parts to the longitudinal axis of the vehicle. The axes 31 and 38, however, of the two joints hold this angle joint in such a manner that it can only operate in a direction transverse to the direction of travel of the vehicle, since both of the said axes, during any possible movement of the steering members, are in one common plane and are perpendicular to each other. It will be obvious that the double joints at the said free ends of the limbs of the angle joint or folding link may take any convenient form and be of any desired construction, the essential consideration being in this connection that the axes of the double joint shall always, in all positions of the parts, be parallel to the direction of length of the vehicle.

Figure 8 illustrates a modified form of the invention wherein an arm 84 may be actuated by means of a shaft 85 and gearing housed in a casing 88 to move longitudinally of the vehicle. An arm 87 of a bell crank 89 pivotally mounted on the axle 41 is provided with transversely movable rods 91 and 93 operably connected to the steerable wheels to actuate the steerable wheels to steer the vehicle.

The longitudinally movable arm 84 and the transversely movable arm 87 may be interconnected to transmit steering movement by means of generally vertically and horizontally extending members 80 and 82 respectively operably interconnecting the arm 84 with an arm 95 of the bell crank 89 having the transversely movable arm 87 fixed thereto.

In the operation of this device when the shaft 85 is rotated the arm 84 is oscillated to move longitudinally of the vehicle, and the members 82 and 80 transmit longitudinal movement to the arm 95 of the bell crank 89 which moves the arm 87 transversely of the vehicle to actuate the steerable wheels through the transversely movable rods 91 and 93. The members 80 and 82 can vary their angular relation relative to each other to compensate lateral and angular movement of the body relative to the axle 41.

I claim:

1. In a steering gear for curve compensating vehicles having front axles and steering wheels thereon, and wherein the upper carriage of the vehicle is adapted to assume an inclined banking position when rounding curves, said steering gear including a steering shaft, a member operatively connected to the steering shaft and movable thereby into member activity in a direction substantially parallel to the longitudinal axis of the vehicle, a second member having a part thereof movable in a direction transverse to the longitudinal axis of the vehicle, operative connections between the second member and steering wheels of the vehicle and a folding link interposed between said first and second members and operatively connected thereto whereby longitudinal movement of the first member effects transverse movement of said part of the second member for the operation of the steering wheels.

2. A steering gear for curve compensating vehicles as set forth in claim 1, characterized by the folding link comprising two members hinged to one another and of which one consists of a horizontally disposed thrust piece mounted on the upper carriage of the vehicle and joined at one end to said first named member, said first named member constituting a main lever having its direction of length transverse to that of the thrust piece and a supplementary lever of the same length as the main lever pivoted on the upper carriage parallel to the main lever and to which the other end of the thrust piece is connected.

3. A steering gear for curve compensating vehicles as set forth in claim 1, characterized by the folding link comprising two members hinged to one another and of which one consists of a horizontally disposed thrust piece mounted on the upper carriage of the vehicle, and joined at one end to said first named member, said first named member constituting a main lever having its direction of length transverse to that of the thrust piece and a supplementary lever of the same length as the main lever pivoted on the upper carriage parallel to the main lever and to which the other end of the thrust piece is connected, the thrust piece being in the form of a plate connected along one edge to the main lever and supplementary lever and hinged along the opposite edge to the other member of the two-part folding link.

4. A steering gear for curve compensating vehicles as set forth in claim 1 characterized by the folding link comprising two members hinged to one another and of which one consists of a thrust piece, said first named member comprising a thrust shaft parallel with the steering shaft and movable in the direction of length thereof and a hinge connection between the lower end of the thrust shaft and thrust piece.

5. A steering gear for curve compensating vehicles as set forth in claim 1 characterized by the folding link comprising two members hinged to one another with the free end of one of the link members articulated to the free end of the first named member that is oscillatable in the direction of length of the vehicle upon the upper carriage thereof, the second named member comprising a bell crank lever oscillatably mounted upon the axle of the front wheels of the vehicle for movement in a horizontal plane, with one arm of the bell crank lever articulated to the free end of the other link member, the axes of the connection of the link members with the first named member and bell crank lever being at all times parallel to the longitudinal axis of the vehicle.

6. A steering gear for curve compensating vehicles as set forth in claim 1, characterized by the folding link comprising two members hinged to one another with the free end of one of the link members articulated to the free end of the first named member that is oscillatable in the direction of length of the vehicle upon the upper carriage thereof, the second named member comprising a bell crank lever oscillatably mounted upon the axle of the front wheels of the vehicle for movement in a horizontal plane, with one arm of the bell crank lever articulated to the free end of the other link member, the axis of the connection between one link member and the first named member being at all times parallel to the road.

7. A steering gear for curve compensating vehicles as set forth in claim 1, characterized by the folding link comprising two members hinged to one another with the free end of one of the link members articulated to the free end of the first named member that is oscillatable in the direction of length of the vehicle upon the upper carriage thereof, the second named member comprising a bell crank lever oscillatably mounted upon the axle of the front wheels of the vehicle for movement in a horizontal plane, with one arm of the bell crank lever articulated to the free end of the other link member, the axis of the articulated joint in the arm of the bell crank lever connected to one of the link members being at all times perpendicular to the road.

8. A steering gear for a vehicle having a front axle provided with steerable wheels and a superstructure, said steering gear comprising a rotatable shaft carried by the superstructure, a member operatively connected to the rotatable shaft and movable longitudinally of the vehicle, a second member operatively connected to the steerable wheels and having a portion movable longitudinally of the vehicle, and motion transmitting means comprising folding link members interconnecting said members whereby movement of the first named member longitudinally of the vehicle moves said portion of the second member longitudinally of the vehicle to steer the wheels, and the link members vary their angular relation to compensate variations of movement of the superstructure relative to the front axle.

9. A steering gear for a vehicle having steerable wheel supporting means and a superstructure, said steering gear comprising first means carried by the superstructure and movable in a plane substantially parallel to the longitudinal axis of the vehicle, second means operatively connected to the steerable wheels and movable in a substantially horizontal plane, and motion transmitting means comprising hingedly connected members hingedly connected to said first and second means whereby movement of the first named means in a plane longitudinally of the vehicle moves the second means horizontally of the vehicle to steer the wheels.

10. A steering gear for a vehicle having steerable wheels carried by wheel supporting means and a body, said steering gear comprising manually operable means and a member carried by the body and having a portion movable longitudinally of the vehicle, a bell crank carried by wheel supporting means and having an arm movable in the longitudinal direction of the vehicle and another arm operably connected to actuate the steerable wheels, and motion transmitting means including folding link members operably interconnecting said member and bell crank to actuate the steerable wheels upon actuation of said manually operable means, the folding link members changing their angular relation to compensate relative movement between said body and wheel supporting means.

11. A steering gear for a curve compensating vehicle having steerable wheels carried by wheel supporting means and a body adapted to shift laterally relative to the wheel supporting means to assume an angularly inclined or banked position under the influence of lateral forces, said steering gear comprising manually operable means and a member carried by the body and having a portion movable longitudinally of the vehicle, a bell crank carried by wheel supporting means and having an arm movable in the longitudinal direction of the vehicle and another arm operably connected to actuate the steerable wheels, and motion transmitting means including folding link members operably interconnecting said member and bell crank to actuate the steerable wheels upon actuation of said manually operable means, the folding link members changing their angular relation to compensate relative movement between said body and wheel supporting means as the body assumes an angularly inclined or banked position under the influence of centrifugal forces developed as the vehicle rounds a curve.

JOACHIM KOLBE.